US010425395B2

United States Patent
Newton et al.

(10) Patent No.: US 10,425,395 B2
(45) Date of Patent: Sep. 24, 2019

(54) SINGLE SIGN ON SYSTEM FOR SECURE NETWORKS

(71) Applicants: Glen E Newton, Roseville, MN (US); Robert L Bergerson, Roseville, MN (US); James R Heit, Roseville, MN (US); Steven R Hallquist, Roseville, MN (US)

(72) Inventors: Glen E Newton, Roseville, MN (US); Robert L Bergerson, Roseville, MN (US); James R Heit, Roseville, MN (US); Steven R Hallquist, Roseville, MN (US)

(73) Assignee: Unisys Corporation, Blue Bell, PA (US)

(*) Notice: Subject to any disclaimer, the term of this patent is extended or adjusted under 35 U.S.C. 154(b) by 232 days.

(21) Appl. No.: 15/137,398

(22) Filed: Apr. 25, 2016

(65) Prior Publication Data

US 2017/0310660 A1    Oct. 26, 2017

(51) Int. Cl.
*H04L 29/06* (2006.01)

(52) U.S. Cl.
CPC ...... *H04L 63/0815* (2013.01); *H04L 63/0281* (2013.01); *H04L 63/0823* (2013.01); *H04L 63/166* (2013.01)

(58) Field of Classification Search
CPC ..... H04L 9/3263–3268; H04L 63/0815–0853; H04L 63/0869; H04L 63/10; H04L 63/20
See application file for complete search history.

(56) References Cited

U.S. PATENT DOCUMENTS

| | | | |
|---|---|---|---|
| 2004/0049702 A1* | 3/2004 | Subramaniam | G06Q 20/382 726/28 |
| 2009/0055642 A1* | 2/2009 | Myers | H04L 63/0869 713/155 |
| 2016/0381000 A1* | 12/2016 | Mathew | H04L 63/0815 726/4 |

* cited by examiner

*Primary Examiner* — Kevin Bechtel (57) ABSTRACT

A client system may be configured to request a single sign on authentication, in which an identity certificate is provided by the client system and stored by a server system. The stored certificate may be used to later authenticate a secure connection between the client system and the server system, after validating that the user represented by the certificate is a legitimate registered user of the server. The secure connection validated by the stored certificate may be, for example, a secure sockets layer/transport layer security (SSL/TLS) connection.

20 Claims, 7 Drawing Sheets

SINGLE SIGN ON SYSTEM FOR SECURE NETWORKS

FIELD OF THE DISCLOSURE

The instant disclosure relates to computer networks. More specifically, this disclosure relates to user authentication in computer networks using an identity certificate.

BACKGROUND

Data is frequently transferred over public networks, in which other users of the network have access to the transferred data. These public networks have become ubiquitous with the explosion of Internet-enabled devices. However, data transferred over public networks may often include sensitive data not intended for viewing by a user other than the recipient. Furthermore, the user may specifically desire to prevent other users from viewing the data. Thus, secure connections may be created over the public networks. The secure connections may encrypt the data to ensure that only the intended recipient may view the data. Secure connections may be established through a secure sockets layer/transport layer security (SSL/TLS) protocol with the aid of a certificate. The server communicating with the client may have a SSL/TLS certificate that provides the client with an assurance that the server is the computer the server claims to be. Furthermore, the certificate may include the public key for use by the client to transmit encrypted data to the server.

The server receiving the connection may also request that the client prove its identity by supplying a certificate.

A SSL/TLS connection cannot be established between two systems, such as a server and a client, without the exchange of the certificate. In order for the connection to he secure, the system that receives the certificate, such as a client, must check whether the certificate is valid. To determine if the certificate is valid, the client system may compare the certificate to a saved list of certificates stored in the client system that were predefined as trusted. Many computer systems will not allow an SSL/TLS connection while acting as a client if the received certificate is not trusted.

Conventionally, many users of client computers use terminal emulation, such as software that runs on the client computer and emulates terminal protocols used by the server. The terminal emulation software is set up to communicate with the server, which prompts the user at the client computer to enter a userid/password to establish his identity. In the usual case, the user will already have established his identity to the client computer. This could be done by supplying a userid and password when logging onto the client computer, or by use of a smart card, such as a Common Access Card (CAC) or by the use of multi-factor authentication, such as supplying a smart card and a corresponding PIN. Having to manually enter a userid and password to connect with the server, after already establishing the user's identity for the client computer, is an inconvenience at best, and if the user needs to establish connections with several different servers, separate manual logons can lead to a proliferation of userid/password combinations, increasing the likelihood of the user's credentials being discovered and misused by someone else.

Single sign-on solutions enable a user at a client workstation to connect to multiple servers without separately supplying credentials when establishing the connections. For example, Kerberos is one such solution. NTLM is another example. In each of those single sign-on solutions, separate external authentication processors are required for processing the Kerberos or NTLM requests and storing authentication information. For some environments, the complexity of deploying Kerberos is prohibitive. Furthermore, in some environments, the requirement to have additional authentication servers for Kerberos or NTLM makes them unacceptable solutions. This disclosure describes a single sign-on solution that does not require an external authentication server.

SUMMARY

Figure 1:
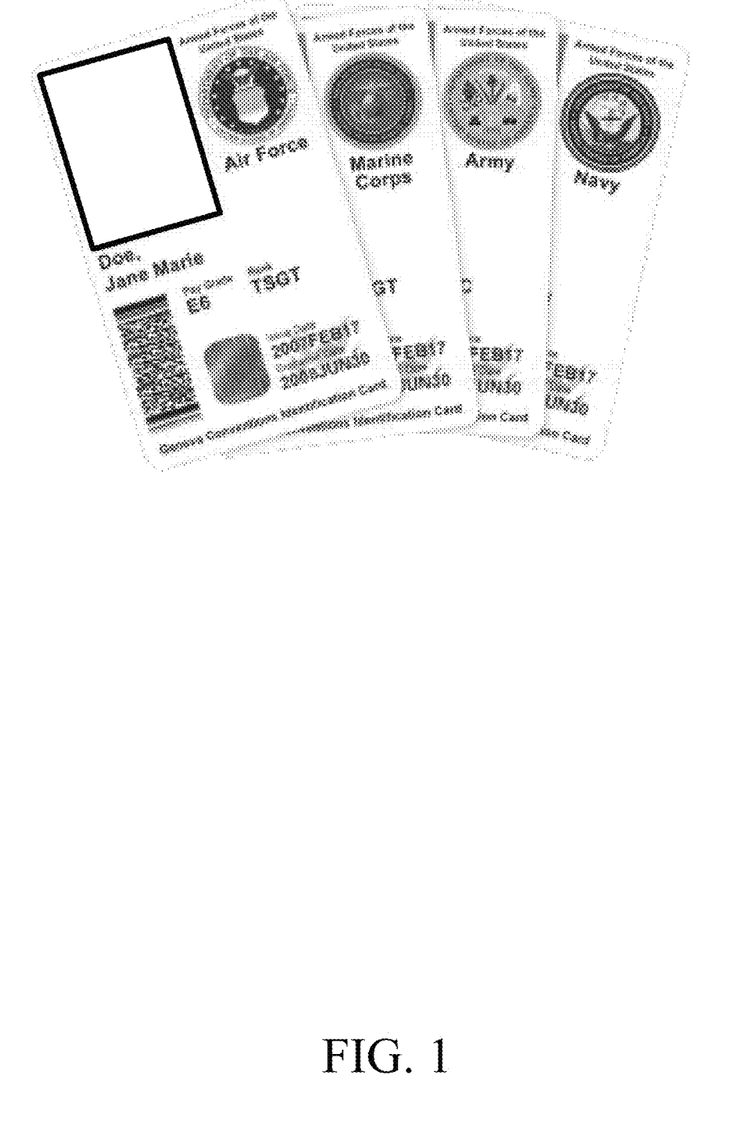
FIG. 1 illustrates exemplary smart cards with integrated circuits (e.g., Common Access Cards (CAC), etc.), which are configured to store an identity certificate according to at least one embodiment of the disclosure.

Certificates may be received through a network connection to provide a sign-on capability to a server, in which the user is authenticated to their client workstation with an identity certificate, such as a public y infrastructure (PKI) certificate. The identity certificate may be preloaded and stored on a card, such as a Smart card with an embedded integrated circuit, e.g., Common Access Card (CAC), as shown in FIG. 1. As a result, the user is not required to enter a username and password to establish a server session when they have been pre-authenticated using a certificate. The Single Sign On (SSC)) system may also allow the user to sign on to different servers, virtual machines (VMs), and/or applications using the certificate.

Two stages of connection are involved. In the first, the network connection, the client establishes a connection with the server through the exchange of certificates. This connection establishment is prior art. The new inventions claimed here are an extension of the first connection in which the client certificate is saved on the server and associated with the network connection, for use in the second connection, and the second stage of the connection, the new method of server connection and client authentication. The client securely establishes its identity through the network connection. It then uses this established connection as the means to attempt the second connection, for which the saved certificate securely identifies the client. The server connection uses a new authentication type, If the client requests this authentication type, it can only be successful if the identity embodied in the certificate represents a registered user of the server. A field on that certificate is compared with user aliases in the server's database of registered users, and the server connection succeeds if a match is found.

According to one embodiment, a method may include establishing a connection with a server. The method includes providing the server a client identity certificate. The method may also include requesting a session certificate from the server. The method may further include receiving the session certificate from the server. The method may also include initiating a secure connection with the server based on verifying that the session certificate represents the identity of a user previously registered as a legitimate user of the server. The method may also include requesting various session information. The method may further include requesting user id and password if an identity certificate is not available.

According to another embodiment, a computer program product may include a non-transitory computer readable medium comprising code to perform the steps of establishing a connection with a server, providing an identity certificate to the server, receiving a session certificate from the server, and initiating a secure connection with the server based, at least in part, on the session certificate. Another computer program product or products may further include a non-transitory computer readable medium comprising code to perform the steps of requesting an identity certificate, saving the identity certificate supplied, extracting information from the identity certificate, comparing that information with stored information about the registered users of the server, making decisions about the validity of the connection request, and optionally requesting various session information. The computer program product may further include a non-transitory computer readable medium comprising code to perform the step of requesting user id and password if an identity certificate is not available.

According to a further embodiment, an apparatus may include a memory, and a processor coupled to the memory, acting as a gateway between the client and the server. The processor may be configured to execute the steps of forwarding the client request to establish a connection with a server, providing the client identity certificate to the server, receiving a session certificate from the server, and initiating a secure connection between client and server based, at least in part, on the session certificate and in part on validation that the client certificate represents a registered user of the server. The processor may be configured to execute the step of forwarding from the server to the client a request for various session information and returning the answers to the server. The processor may be configured to execute the step of forwarding from the server to the client a request for user id and password if an identity certificate is not available.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

In many secure networks, a server may request a signed digital certificate (e.g., identity certificate, etc.) using a certificate signing request (CSR). In many embodiments, a key pair is first generated while the private key remains secret (e.g., not transmitted, etc.). The public key is transmitted and used to sign the CSR. The public key may contain information identifying the user and the users public key (e.g., Distinguished Name (DN)) as well as the qualified domain name of the certificate. Additionally, the CSR may include other credentials or proofs of identity required by the certificate authority and/or network. The certification authority may issue a certificate binding a public key to a particular distinguished name.

Figure 2:
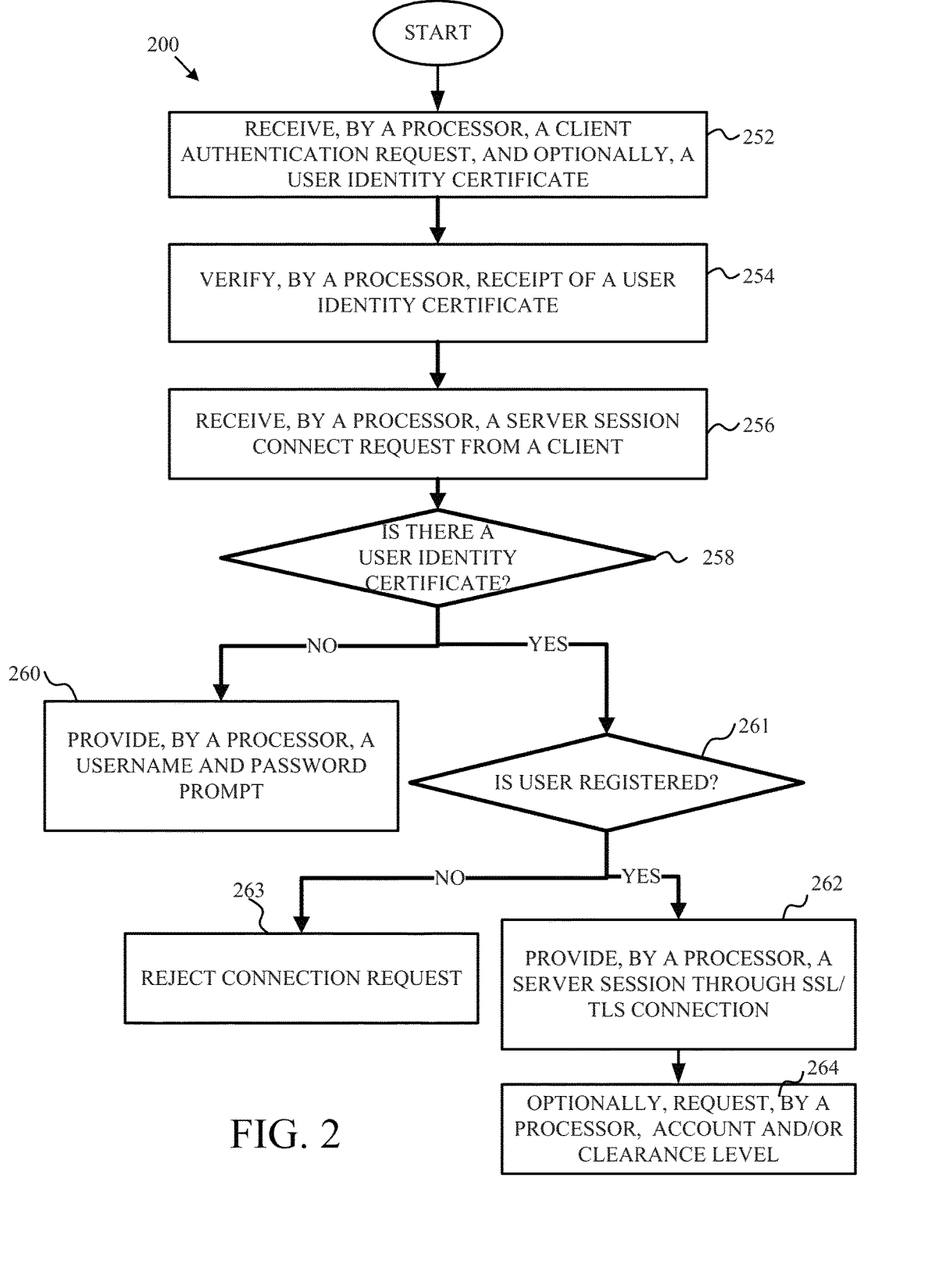
FIG. 2 is a flow chart illustrating a method for user authentication using an identity certificate according to at least one embodiment of the disclosure.

FIG. 2 is a flow chart illustrating a method for a Single Sign On (SSO) authentication (e.g., access control) according to at least one embodiment of the disclosure. The method may use Transport Layer Security (TLS) protocol at various steps (i.e., blocks); however in some embodiments, the steps may use an alternative security protocol (e.g., SSL, etc.). Further, the steps may be performed between a client computer and a server (e.g., mainframe); however in some embodiments, there may be intermediate servers that, for example, act as security gateways (e.g., management servers, security proxy servers, etc.) between the client and the destination server (i.e., mainframe). Further, some of the steps may be performed in an emulated environment and/or non-native OS environment while other steps may be performed in a non-emulated environment and/or native OS environment (e.g., host environment, etc.).

According to at least one embodiment, the method 200 begins at block 252 with receiving a client authorization request. Step 252 may be preceded by the client computer requesting authorization from the server. Further, the request may go through at least one security gateway, which may be separate from the destination server, or instead, a component of the destination server. The client computer may be a PC, which may further include software for connecting a client browser to a mainframe server. Such exemplary software may include, without limitation, Micro Focus® Management and Security Server or Micro Focus INFOConnect®. In some embodiments, such as when the server is a Unisys Dorado® mainframe running ClearPath OS2200® software, the session request may be a $$OPEN command to the server.

In many embodiments, the session request includes an identity certificate provided by the client. In other embodiments, the identity certificate may be requested by the server after establishing a connection with the server system. The identity certificate may be preloaded and stored on a card, such as a Smart card with an embedded integrated circuit, e.g., Common Access Card (CAC), as shown in FIG. 1. The identity certificate may be stored locally on the server to be used during later validation of a secure connection with the server. The identity certificate of block 252 may be saved by the server as part of the SSL or TLS handshake. At block 254, receipt of the user identity certificate is verified. At block 256, a server session connect request may be received from a client.

At block 256, a secure connection, such as a SSL/TLS connection, may be initiated with the server. In some embodiments, the server may be validated based on the received certificate. For example, the client system may request a session certificate from the server system during initiation of the SSL/TLS connection. The client system may validate the certificate by comparing the certificate to previously-stored certificates. The session certificate may include a secure token authorization to allow a session with encryption that may use, but is not limited to, the AES algorithm, over SSL/TLS or SSH. When the server is validated, data transfer with the server through the secure connection may take place.

In some embodiments, the server may validate the client by verifying that it has received an identity certificate before initiating the SSL/TLS connection, as shown at block 258. If no valid identity certificate is located, the server may provide a username and password prompt to the client at block 260. If a valid identity certificate is found at block 258, then the server may validate that the identity certificate identifies a user who is registered on the server, as shown at block 261. In most embodiments, if the user is registered on the server, then a server session is provided through a SSL/TLS connection, as shown at block 262. In most embodiments, if the user is not registered, then the connection request may be rejected, as shown at block 263. Either before or after block 262, the server may prompt the client computer for additional information, such as account information and/or clearance level, shown as block 264.

Figure 3:
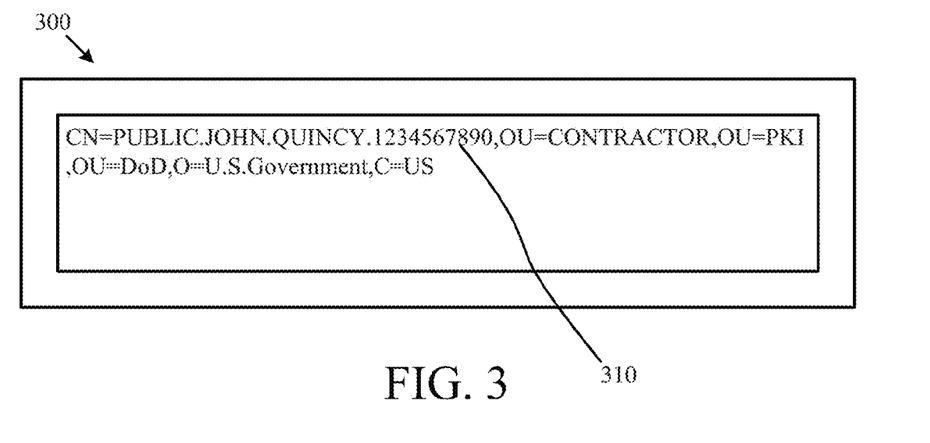
FIG. 3 is a data field from an identity certificate according to at least one embodiment of the disclosure.

FIG. 3 is an identity certificate's data illustrating the user's information. The certificate data may include various fields. For example, the CN field of the CAC includes the user identification record 300. One such exemplary format includes name and/or a unique identity, such as NN, a multiple digit number or code. In various embodiments, the identity information from the CN field may be used to establish the network user identification. For example, such combinations of CN information used to create the network identification may include, without limitation:
LastName.FirstName.MiddleName.NN;
NN; or
FirstName.LastName.
In some embodiments, the "LastName.FirstName.MiddleName.NN" data combination is used to avoid the extraction of discrete portions of data from the CN field.

Figure 4:
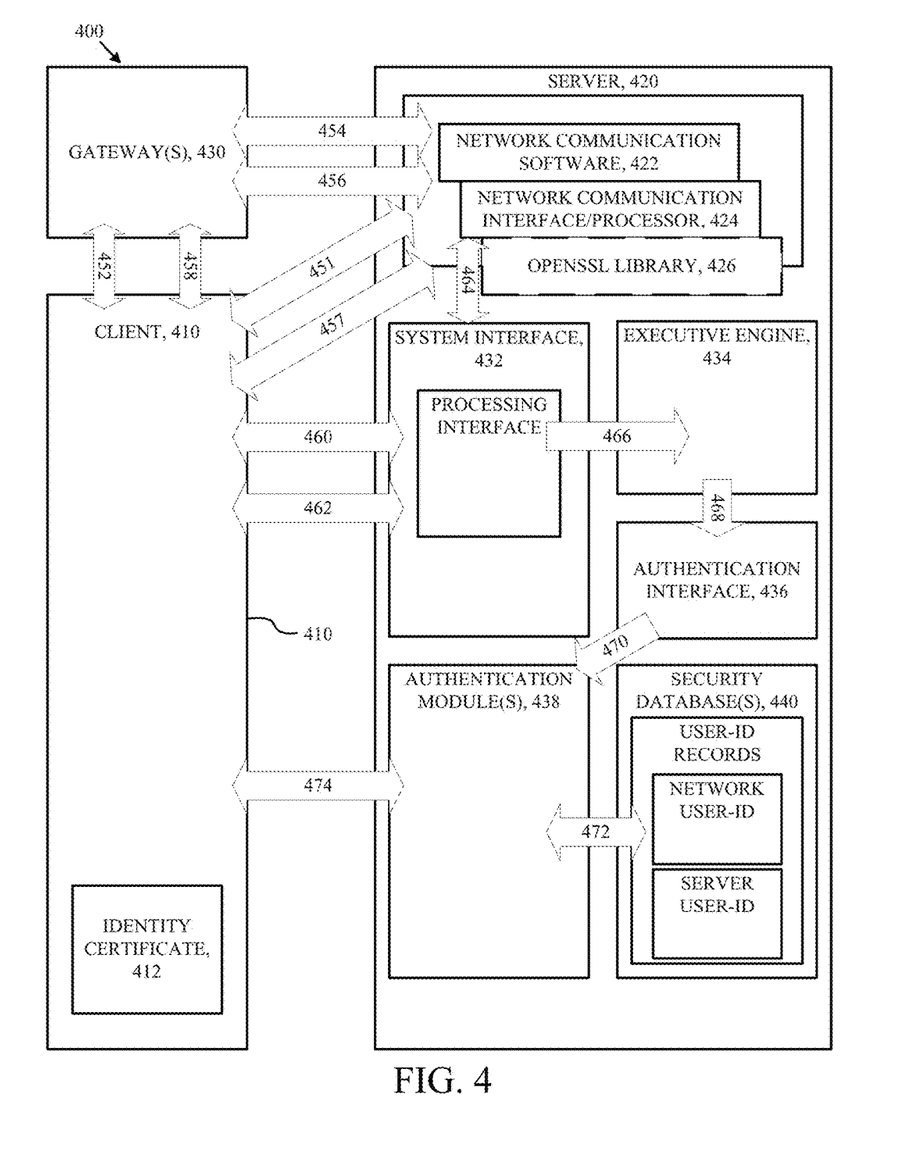
FIG. 4 is a block diagram illustrating actions following receiving a command from a client to authenticate a server session according to at least one embodiment of the disclosure.

FIG. 4 is a block diagram illustrating actions following receiving a command from a client 410 to authenticate a server session according to at least one embodiment of the disclosure. At 451, a command to establish a communication path is sent from the client, such as a $$OPEN command. In some embodiments, the command is routed, as shown at 452, through a security gateway 430 to the destination server 420, as shown at call 454. In many embodiments, the command is accompanied with or followed by the user's identity certificate 412. In some embodiments, the server and client may further exchange certificates, as illustrated at 456 and 458 if a gateway is involved, or at 457 if there is no gateway. The command is received by the server's communication software 422 (e.g., CPCommOS or CPComm) operating through communication ports or the network communication interface/processor (e.g., XNIOP) and if the user's identity' certificate is provided, it is saved. The identity certificate may he provided as part of a SSL or TLS handshake as shown at 454 or 456. The communication interface/processor 424 may validate the identity certificate using algorithms provided by OpenSSL 426 or other server-side software.

At 460, a client connects to the server 420 through one of at least two possible routes. The connect request may be a TP0 connect request. In one example, the client connects to the server through a transaction interface package (e.g., TIP) processing interface. In another example, the user connects to the server through a time sharing (e.g., demand) processing interface. Either processing interface may be accessed through a system interface(s) 432, such as a System Interface for Legacy Application Systems. In conjunction with the connection attempt at 460, various information may be provided to the system interface 432, such as the requested authentication type and/or a zero-length ticket. As illustrated, some of the steps may not proceed through the security gateway 430; however, in some embodiments, it may be preferred for most or all steps to proceed through a security gateway.

At 462, the server may request additional information, such as client terminal type. The client may respond with terminal type, authentication type, length 0 ticket, or any combination thereof.

At 464, the system interface 432 may retrieve the identity certificate saved by the communication interface/processor 424. In some embodiments, including the case in which the new certificate-based authentication type is specified, if there is no saved identity certificate, the connection is rejected. At 466, the system interface 432 sends the retrieved identity certificate to an executive engine 434 for processing. The executive engine 434 may include the batch processing system, and further, may manage the system hardware. At 468, the executive engine 434 may call an authentication interface 436, such as ASIS, the Authentication and Session Initiation Subsystem, to process the authentication. The authentication interface 436 may call an authentication module(s) 438. The retrieved certificate may passed from the executive engine 434, through the authentication interface 436, to the authentication module 438.

The authentication module 438 may extract the identity information from the retrieved certificate, such as the exemplary CN field information illustrated in FIG. 3. The authentication module 438 may connect with a security database 440 to search for a database user-id record whose network user-id field matches the retrieved certificate. If a matching user-id record is found, the authentication request is authorized.

At 474, the executive engine 434 in conjunction with the authentication module(s) 438 processes the authentication and logon, establishing the server session (e.g., transaction processing session, time sharing session, etc.). Optionally, the executive engine 434 may request additional information such as user account information and/or clearance level information. This additional information may be performed before or after the executive engine 434 processes the authentication and logon.

Figure 5:
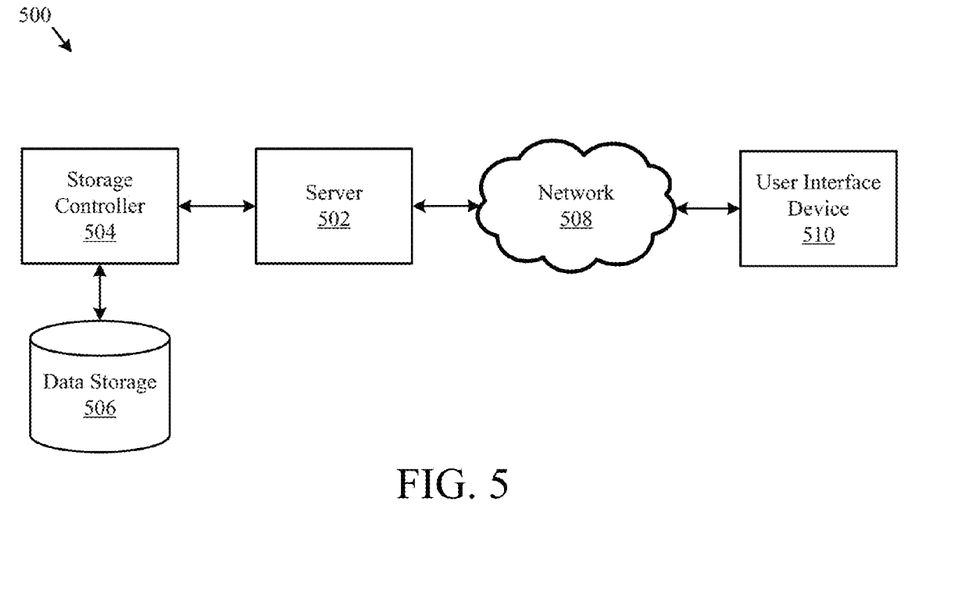
FIG. 5 is a block diagram illustrating a computer network according to at least one embodiment of the disclosure.

FIG. 5 illustrates one embodiment of a system 500 for an information system, including a system for transferring certificates. The system 500 may include a server 502, a data storage device 506, a network 508, and a user interface device 510. The server 502 may also be a hypervisor-based system executing one or more guest partitions hosting operating systems with modules having server configuration information. In a further embodiment, the system 500 may include a storage controller 504, or a storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other mobile communication device having access to the network 508. When the device 510 is a mobile device, sensors (not shown), such as a camera or accelerometer, may be embedded in the device 510. When the device 510 is a desktop computer the sensors may be embedded in an attachment (not shown) to the device 510. In a further embodiment, the user interface device 510 may access the Internet or other wide area or local area network to access a web application or web service hosted by the server 502 and may provide a user interface for enabling a user to enter or receive information.

The network 508 may facilitate communications of data between the server 502 and the user interface device 510. The network 508 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 6:
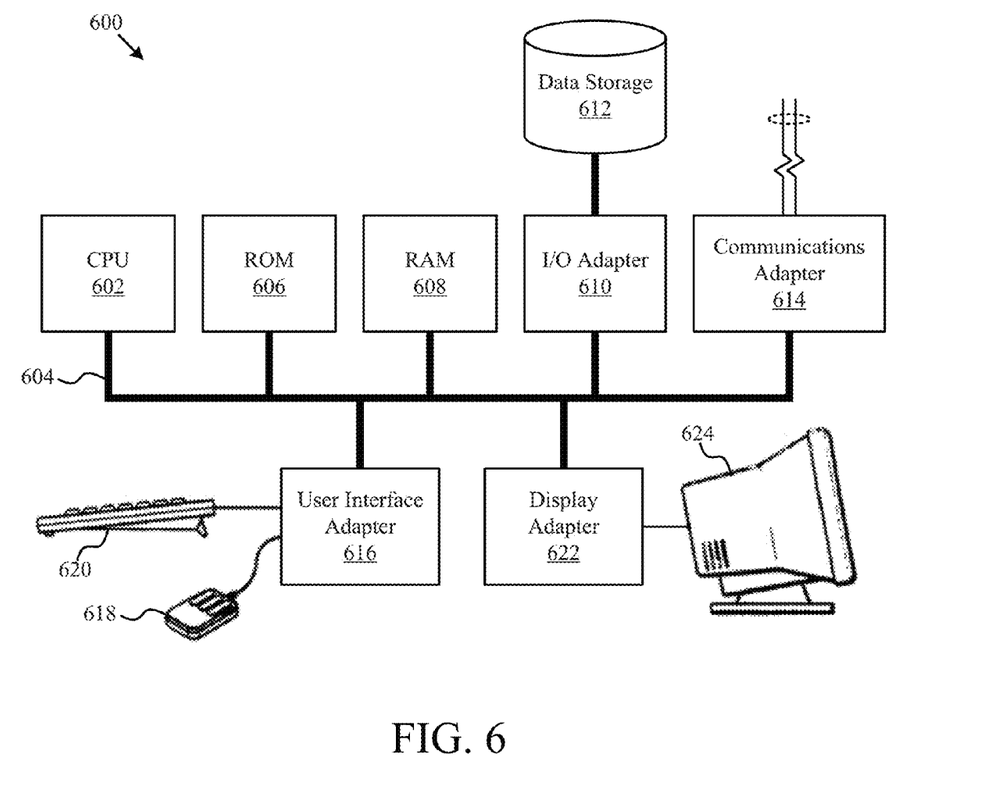
FIG. 6 is a block diagram illustrating a computer system according to at least one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 also may include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 800 may also include read only memory (ROM) 806 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 508, which may be one or more of a LAN, WAN, and/or the Internet. The user interface adapter 616 couples user input devices, such as a keyboard 620, a pointing device 618, and/or a touch screen (not shown) to the computer system 600. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of the server 502 and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

Figure 7A:
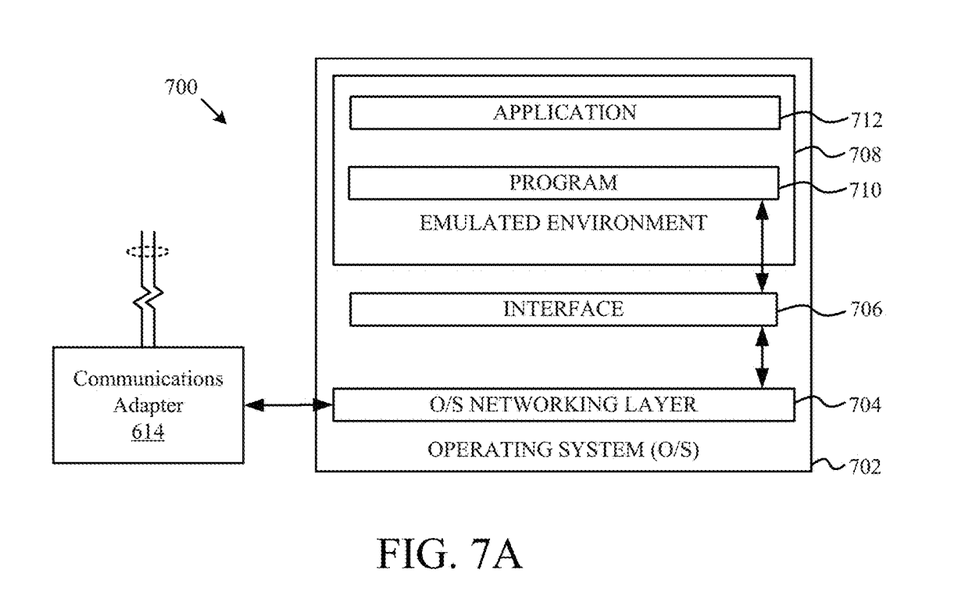
FIG. 7A is a block diagram illustrating a server hosting an emulated software environment for virtualization according to at least one embodiment of the disclosure.

FIG. 7A is a block diagram illustrating a server hosting an emulated software environment for virtualization according to one embodiment of the disclosure. An operating system 702 executing on a server includes drivers for accessing hardware components, such as a networking layer 704 for accessing the communications adapter 714. The operating system 702 may be, for example, Linux or Windows. An emulated environment 708 in the operating system 702 executes a program 710, such as Communications Platform for Open Systems (CPCommOS or CPComm). The program 710 accesses the networking layer 704 of the operating system 702 through a non-emulated interface 706, such as eXtended Network Input Output Processor (XNIOP). The XNIOP may access an OpenSSL library for logging authentication, e.g., client or server authentications attempted and/or when a SSL and/or TLS handshake error occurred. The non-emulated interface 706 translates requests from the program 710 executing in the emulated environment 708 for the networking layer 704 of the operating system 702. Applications 712 may also be executing in the emulated environment 708 or inside of program 710, In one embodiment, these applications 712 may access the networking layer 704 of the operating system 702 through a non-emulated interface 706 using program 710.

Figure 7B:
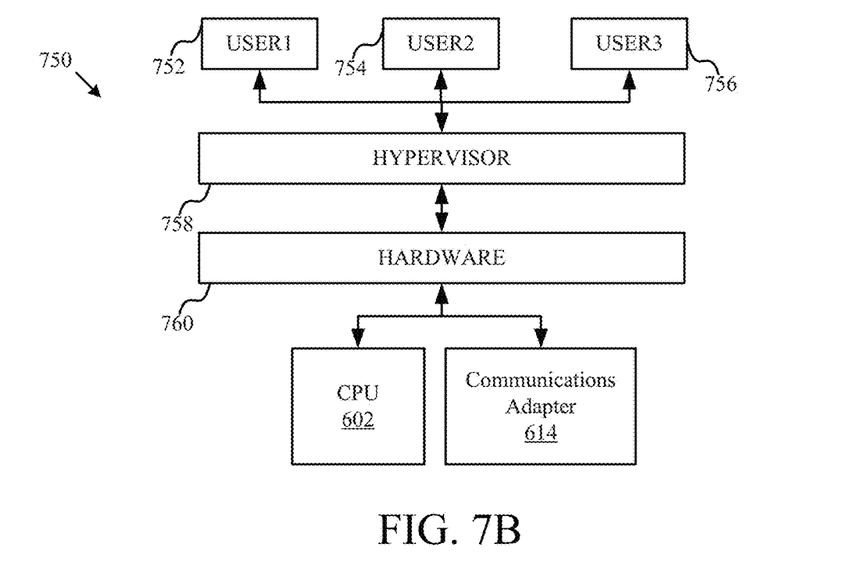
FIG. 7B is a block diagram illustrating a server hosting an emulated hardware environment according to at least one embodiment of the disclosure.

In another example, hardware in a computer system may be virtualized through a hypervisor. FIG. 7B is a block diagram illustrating a server hosing an emulated hardware environment according to one embodiment of the disclosure. Users 752, 754, 756 may access the hardware 760 through a hypervisor 758. The hypervisor 758 may be integrated with the hardware 760 to provide virtualization of the hardware 760 without an operating system, such as in the configuration illustrated in FIG. 7A, The hypervisor 758 may provide access to the hardware 760, including the CPU 602 and the communications adaptor 614.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of single sign-on technology, comprising:
    receiving, by a processor of a server, a first network connection request and a user identity certificate from a client for client authentication, wherein the first network connection request is initiated by the client through a first emulated environment;
    verifying, by the processor, receipt of a user identity certificate associated with the first network connection request over which a server session request arrived;
    receiving, by the processor, the server session request using a certificate-based authentication;
    verifying, by the processor, that the user identity certificate corresponds to a registered user previously saved on the server;
    initiating a secure connection between the client and the server based, at least in part, on the user identity certificate;
    receiving, by the processor, a second network connection request from the client, wherein the second network connection request is sent to the processor through the secure connection, the second network connection request is initiated by the client using a second emulated environment, the second network request does not include the user identity certificate; and
    granting, by the processor, the second network connection between the server and the second emulated environment by verifying that a user identifier associated with the second network connection request matches the user identity certificate previously saved.

2. The method of claim 1, further comprising storing the certificate, by the processor, in a library after receiving the certificate.

3. The method of claim 2, in which the step of receiving the first network connection request and the user identity certificate further comprises receiving the first network connection request and user identity certificate from a security gateway.

4. The method of claim 3, wherein the step of receiving the first network connection request and the user identity certificate is performed by a network communication interface and the step of receiving the server session connect request is performed by a system interface.

5. The method of claim 3, further comprising transferring data to the server through the secure connection.

6. The method of claim 1, in which the certificate comprises a secure socket layer/transport layer security (SSL/TLS) certificate.

7. The method of claim 1, wherein the user identity certificate is authenticated in comparison with a secret PKI user-id record.

8. A computer program product of single sign-on technology, comprising:
    a non-transitory computer readable medium comprising code that, when executed by a server, causes the server to perform operations comprising:
        receiving a first network connection and authentication request and a user identity certificate from a client, wherein the first network connection request is initiated by the client through a first emulated environment;
        verifying receipt of a user identity certificate associated with the first network connection request over which a server session request arrived;
        receiving the server session request using a certificate-based authentication;
        verifying that the user identity certificate corresponds to a registered user previously saved on the server;
        initiating a secure connection between the client and the server based, at least in part, on the user identity certificate;
        receiving a second network connection request from the client, wherein the second network connection request is sent to the processor through the secure connection, the second network connection request is initiated by the client using a second emulated environment, the second network request does not include the user identity certificate; and
        granting the second network connection by verifying that a user identifier associated with the second network connection matches the user identity certificate previously saved.

9. The computer program product of claim 8, in which the medium further comprises code to perform the step of storing the certificate in a library after receiving the certificate.

10. The computer program product of claim 9, in which the medium further comprises code to perform the step of receiving the first network connection request and user identity certificate from a security gateway.

11. The computer program product of claim 10, wherein the step of receiving the first network connection request and the user identity certificate is performed by a network communication interface and the step of receiving the server session connect request is performed by a system interface.

12. The computer program product of claim 10, in which the medium further comprises code to perform the step of transferring data to the server through the secure connection.

13. The computer program product of claim 10, in which the certificate comprises a secure socket layer/transport layer security (SSL/TLS) certificate.

14. The computer program product of claim 10, wherein the user identity certificate is authenticated in comparison with a secret PKI user-id record.

15. A server of single sign-on technology, comprising:
a processor; and
a memory coupled to the processor, the memory comprising code that, when executed by the processor, causes the processor to perform operations comprising:
receiving a first network connection and authentication request and a user identity certificate from a client, wherein the first network connection request is initiated by the client through a first emulated environment;
verifying receipt of a user identity certificate associated with the first network connection request over which a server session request arrived;
receiving the server session request using a certificate-based authentication;
verifying that the user identity certificate corresponds to a registered user previously saved on the server;
initiating a secure connection between the client and the server based, at least in part, on the user identity certificate;
receiving a second network connection request from the client, wherein the second network connection request is sent through the secure connection, the second network connection request is initiated by the client using a second emulated environment, the second network request does not include the user identity certificate; and
granting the second network connection by verifying that a user identifier associated with the second network connection matches the user identity certificate previously saved.

16. The apparatus of claim 15, in which the processor is further configured to perform the step of storing the certificate in a library after receiving the certificate.

17. The apparatus of claim 15, in which the certificate comprises a secure socket layer/transport layer security (SSL/TLS) certificate.

18. The apparatus of claim 15, in which the processor is further configured to perform the step of receiving the client authorization request and user identity certificate from a security gateway.

19. The apparatus of claim 18, wherein the step of receiving the client authorization request and the user identity certificate is performed by a network communication interface and the step of receiving the server session connect request is performed by a system interface.

20. The apparatus of claim 15, in which the processor is further configured to perform the step of transferring data to the server through the secure connection.

\* \* \* \* \*